US006626699B1

(12) United States Patent
Epe et al.

(10) Patent No.: US 6,626,699 B1
(45) Date of Patent: Sep. 30, 2003

(54) ELECTRIC PLUG CONNECTOR HAVING HOLDER FOR HOLDING FIRST CONNECTOR PART ON FIRST WALL SIDE AND ENABLING ROTATION OF GUIDE SLEEVE ON SECOND WALL SIDE WITH RESPECT TO FIRST CONNECTOR PART

(75) Inventors: Peter Epe, Lennestadt (DE); Stefan Sommer, Saulgau (DE); Christian Fritzsche, Regensburg (DE)

(73) Assignees: Leopold Kostal GmbH & Co. KG, Ludenscheid (DE); ZF Friedrichshafen AG, Friedrichshafen (DE); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/857,564

(22) PCT Filed: Jan. 5, 2000

(86) PCT No.: PCT/EP00/00032

§ 371 (c)(1), (2), (4) Date: Jun. 6, 2001

(87) PCT Pub. No.: WO00/45470

PCT Pub. Date: Aug. 3, 2000

(30) Foreign Application Priority Data

Jan. 30, 1999 (DE) ........................................ 199 03 712

(51) Int. Cl.[7] ........................ H01R 13/60; H01R 13/73; H01R 13/62; H01R 13/625; H02B 1/01

(52) U.S. Cl. ........................ 439/527; 439/546; 439/311

(58) Field of Search ................................ 439/544, 248, 439/527, 545, 546, 34, 310, 311

(56) References Cited

U.S. PATENT DOCUMENTS

| | | | | |
|---|---|---|---|---|
| 3,951,500 A | * | 4/1976 | Anderson | 439/248 |
| 5,642,999 A | | 7/1997 | Kidd et al. | 439/34 |
| 5,662,488 A | | 9/1997 | Alden | 439/314 |

FOREIGN PATENT DOCUMENTS

| | | |
|---|---|---|
| DE | 90 03 016.8 | 8/1991 |
| DE | 297 21 908 U1 | 3/1998 |
| DE | 197 49 852 A1 | 6/1999 |
| EP | 0 355 276 A1 | 2/1990 |

* cited by examiner

*Primary Examiner*—Chandrika Prasad
(74) *Attorney, Agent, or Firm*—Brooks & Kushman P.C.

(57) ABSTRACT

A plug-in connector for establishing an electrical connection between two regions separated by a wall having a mounting hole includes a connector part having electrical contacts and located on one side of the wall. A guide bushing is located on the other side of the wall. The lower end of the guide bushing passes through the mounting hole to bear the plug contacts. The connector part and the guide bushing connect when the guide bushing is rotated with respect to the connector part such that connector part and the guide bushing are aligned longitudinally. The connector part is held on the wall such that the connector part is aligned with the mounting hole and is movable along the longitudinal axis of the guide bushing. A stop limits the movement of the connector part away from the guide bushing which is affixed on the wall opposite the connector part.

8 Claims, 3 Drawing Sheets

ELECTRIC PLUG CONNECTOR HAVING HOLDER FOR HOLDING FIRST CONNECTOR PART ON FIRST WALL SIDE AND ENABLING ROTATION OF GUIDE SLEEVE ON SECOND WALL SIDE WITH RESPECT TO FIRST CONNECTOR PART

The invention relates to the field of electrical plug connectors for establishing an electrical connection between two electrical regions separated from one another by a wall. The invention relates in particular to an electrical plug connector comprising a first plug connector part having electrical plug contacts, a second electrical plug connector part having electrical contact jacks, as well as a guide bushing that is designed to be passed through a mounting hole located in a wall and which at one end bears the first plug connector part and on the other end the second plug connector part, means for affixing the plug connector to the wall being assigned to same.

Such electrical plug connectors are required, for example, in the use of gear control systems in motor vehicles. In such cases, the gear wall is the wall or partition wall between an electrical plate located inside the gear housing, upon which is fitted a connector part having electrical plug contacts with a pin housing to establish electrical contact with the electrical plate. To achieve contact of the electrical plug contacts of the plug part, a plug socket part is provided that can be attached to the electrical plug contacts for providing the desired electrical plug connector with the contact jacks contained in the socket part. The socket part is arranged at one end of a set of lines whose other end is connected to the inputs and outputs of an electronic control system that monitors and controls the electronic systems within the gear housing.

Such a plug connector is known from German Utility Model DE 297 21 908 U1. For the electrical plug connector represented in this document, the plug part as described above is part of the electrical plate from which the electrical plug contacts project in the direction of the gear wall. The plug contact arrangement is bordered by a bridge-like housing wall that forms a receptacle for receiving a guide bushing. The guide bushing is arranged to project upward from the electrical plate and through the gear wall and to border the inside of the insert edge. The guide bushing is connected to the insert edge by a fastening clamp. With a section having locking grooves on the outer side, the guide bushing projects from the gear wall on the side opposite to the electrical plate. The locking grooves serve to lock a bayonet ring that is fitted to the socket part to secure the electrical plug connection created.

The bayonet ring has on its end at the plug side a support flange that is supported on the outer surface of the gear wall. The bayonet locking is designed such that, when the bayonet ring is placed or rotated to achieve locking, the guide bushing is withdrawn to a specified extent from the gear wall. To the gear wall are attached elements which act like groove pins and facing the electrical plate, which engage into centering and fastening sockets corresponding to the electrical plate. When the bayonet ring is locked to the guide bushing, thus causing the guide bushing to be withdrawn or the electrical plate to be pulled toward the gear wall, the elements with similar action as groove pins are pressed into the centering and fastening sockets fitted to said elements. After the bayonet ring is set in place, the electrical plug connector as well as the electrical plate for the connector part are then fastened to the gear wall.

A disadvantage of this known plug connector is that the guide bushing must be attached to the pin housing by means of a fastening clamp in order to mount the plug connector. This known plug connector is therefore not suitable for such uses in which access cannot be gained behind the wall separating the two electrical regions in order to establish electrical contact. In addition, the elements with similar action as groove pins that are used for attachment to the partition wall sometimes do not represent a completely ideal solution. In a so-called "blind mounting" to establish electrical contact between the two plug connector sites, whereby the plug connector part located behind the wall—the pin housing—is reachable only through the mounting hole through the wall, it cannot be determined if the electrical plate has actually been attached correctly to the inner side of the wall.

The reliability of the plug connector on the wall, disclosed in DE 297 21 908 U1, is strongly dependent on the quality of the frictional grip between the outer surface of the elements which act like groove pins and the cylindrical inner surfaces of the centering and fastening sockets. In order to produce a connection that withstands strong pull-out forces, the connection requires a dimensional configuration of the elements which act like groove pins and the centering and fastening sockets such that the former must be pressed with strong force into the latter. As the number of fastening points used increases—approximately three being customarily used—the force required to produce a connection also increases. Because of production tolerances in the arrangement of the centering and fastening sockets and the elements which act like groove pins, the electrical plate can be subjected to undesired tension after being placed on the gear wall.

SUMMARY OF THE INVENTION

Proceeding from the prior art previously discussed, the objective of the invention is thus to develop a generic electrical plug connector as described hereinabove that not only assures a secure "blind mounting," but also allows a tension-free attachment to the partition wall.

This objective is achieved by the invention in that the one plug connector part and the guide bushing have cooperating connecting means which if the guide bushing is rotated connect said two parts such that they are aligned with the longitudinal axis of the guide bushing, and that the plug connector comprises holding means with which the plug connector part is held on the side of the wall such that it can be displaced in the direction of the longitudinal axis of the guide bushing, with a stop for limiting the distance along which the plug connector can be moved away from the guide bushing, and that means for affixing the guide bushing to the side of the wall opposite the plug connector are assigned to said guide bushing.

For the electrical plug connector according to the invention, connection means for fastening the guide bushing to the plug connector part located behind a partition wall are used such that the two said parts can be connected without additional elements. Moreover, the connection between the guide bushing and the connection means is established by rotating the guide bushing so that a connection between the two said parts can be made by rotation of the guide bushing. If, for some reason, this rotation cannot be performed in whole or in part, the assembler is aware that a proper attachment is not possible. A holder is provided to assure proper alignment of the plug connector part, located on the inaccessible side of the wall, with the mounting hole. The plug connector part is supported with freedom to move by said holder in the direction of the longitudinal axis of the guide bushing. An arrangement of stops limits the distance along which the plug connector part can be moved away from the guide bushing, so that during mounting of the guide bushing the plug connector part is not pushed away. Means for attaching the plug connector to the wall are assigned to the guide bushing to allow an attachment of the guide bushing to the accessible side of the wall. The plug connector is thus attached to the wall in a region in which the plug connector is always accessible, thereby enabling the plug connector to be easily detached from the wall.

The connection means for connecting the guide bushing that passes through the wall to the plug connector part located behind said wall can be designed, for example, as a screw thread or a bayonet locking. In the development of a bayonet locking, it is useful to design the locking slot as an annular body and to provide same on the plug connector part, and to provide radially projecting locking pegs on the guide bushing. Provision of a bayonet locking allows the guide bushing to be quickly and securely mounted to the plug connector part. Based on an insertion opening for introducing the locking pegs, the locking slot of the plug connector part can be designed to lie in a plane perpendicular to the longitudinal axis of the guide bushing, or with an inclined section that is aligned crosswise to the longitudinal axis of same and that slopes away from the insertion opening. In the latter case, during attachment of the guide bushing the plug connector part is pulled toward the guide bushing, so that the plug connector part can be brought from a mounting position in the holder to a plug connector position.

As an example of a means for affixing the guide bushing to the accessible side of the wall, a fastening bracket that is integrally formed radially to the guide bushing can be provided with an opening facing the wall, into which a screw can be inserted or is already inserted to affix the guide bushing on the wall. By attachment of the guide bushing, along with the plug connector fastened thereto, to the wall, the entire plug connector is affixed to the wall.

As a holding means for the plug connector part, a plurality of holding feet can be provided that are held, with some play with regard to their width, in a guiding groove of a holder that is provided on the plug connector part. As an example, the feet can be integrally formed onto a base plate of the plug connector part and held in the guiding groove by virtue of their material elasticity.

An electrical connection between the inaccessible plug connector part, which, for example, can be the plug part provided with a pin housing, and the electrical/electronic components placed on a circuit support at a distance from the plug connector part is achieved by means of a flexible conductor such as a foil conductor. Thus, vibrations occurring between the unit bearing the electrical/electronic components and the partition wall are not transmitted from one unit to the other.

BRIEF DESCRIPTION OF THE DRAWINGS

Further advantages and developments of the invention are described in the following description of an embodiment example, with reference to the attached drawings. The drawings show the following.

BEST MODES FOR CARRYING OUT THE INVENTION

Figure 1:
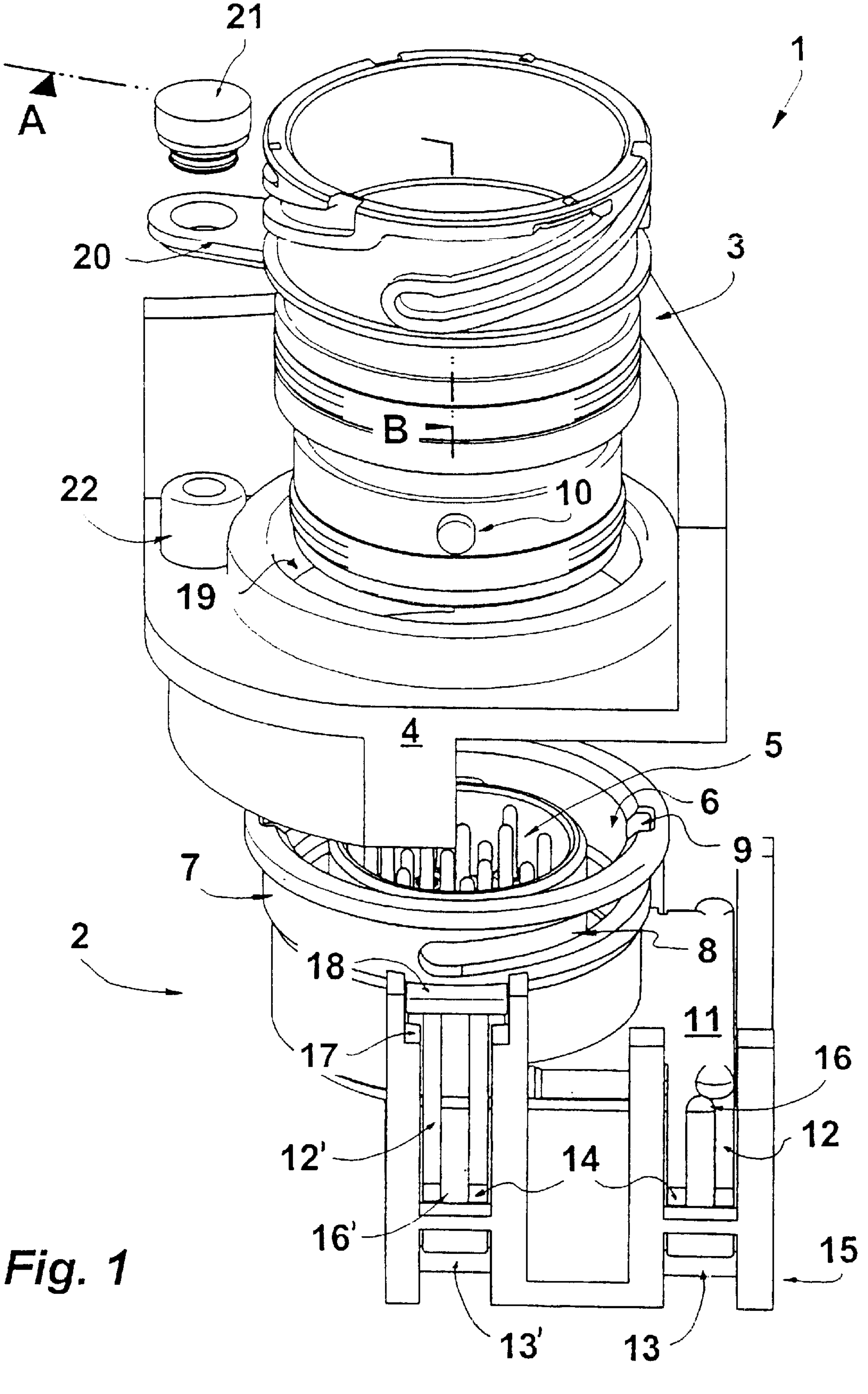
FIG. 1 shows in perspective view an exploded representation of an electrical plug connector.

An electrical plug connector 1, of which the one plug connector part 2 and a guide bushing 3 are shown in the figures, provides contact for electrical/electronic components placed within an automotive gearing system. The section of a gear housing is denoted by the reference number 4 in the figures.

The plug connector part 2 comprises a plug part in which a pin housing 5 bearing an electrical plug contact is inserted. The pin housing 5 is held in a mounting slot 6 and enclosed by a concentric annular body 7 into whose walls are built locking slot 8 as part of a bayonet locking. For each locking slot 8, facing the guide bushing 3, is provided an insertion opening 9 into which a locking peg 10 that is integrally formed to the guide bushing 3 can be inserted.

The plug part 2 is placed on a base 11 from which four downwardly projecting holding feet 12, 12' are integrally formed. At their free ends, the holding feet 12, 12' have lower stops 13, 13'. At a distance from the stops 13, 13' are arranged snap-on cams 14, 14' that hold the base 11 and thus the plug part 2 against a holder 15. The holder 15 in turn is fastened within the gearing. To hold the holding feet 12, 12', said holding feet engage respectively in guiding grooves 16, 16', whereby the guiding is provided with a certain amount of play.

The guiding grooves 16' in their upper region have a shoulder 17 that enlarges the width of the guiding groove 16', and a bracket 18 integrally formed to the plug part 2 engages in the enlarged section of the guiding groove. The bracket 18 and shoulder 17 limit the possible movement of the plug part 2 in the direction of the longitudinal axis of the guide bushing 3.

The guide bushing 3 has an axial longitudinal extension that is long enough to engage with its lower end region, along with the locking pegs 10, in the locking slot 8 of the plug part 2, and then with its other end to extend far enough out of a mounting hole 19 placed in the gear wall 4 such that the plug connector part (plug jack part), not shown in the figures, can be placed on said other end. Into a fastening bracket 20, integrally formed on the guide bushing 3 and projecting radially outward therefrom, is inserted a fastening screw 21. The fastening screw 21 penetrates the fastening bracket 20, thereby enabling the guide bushing 3 to be attached to the exterior of the gear wall 4.

Figure 2:
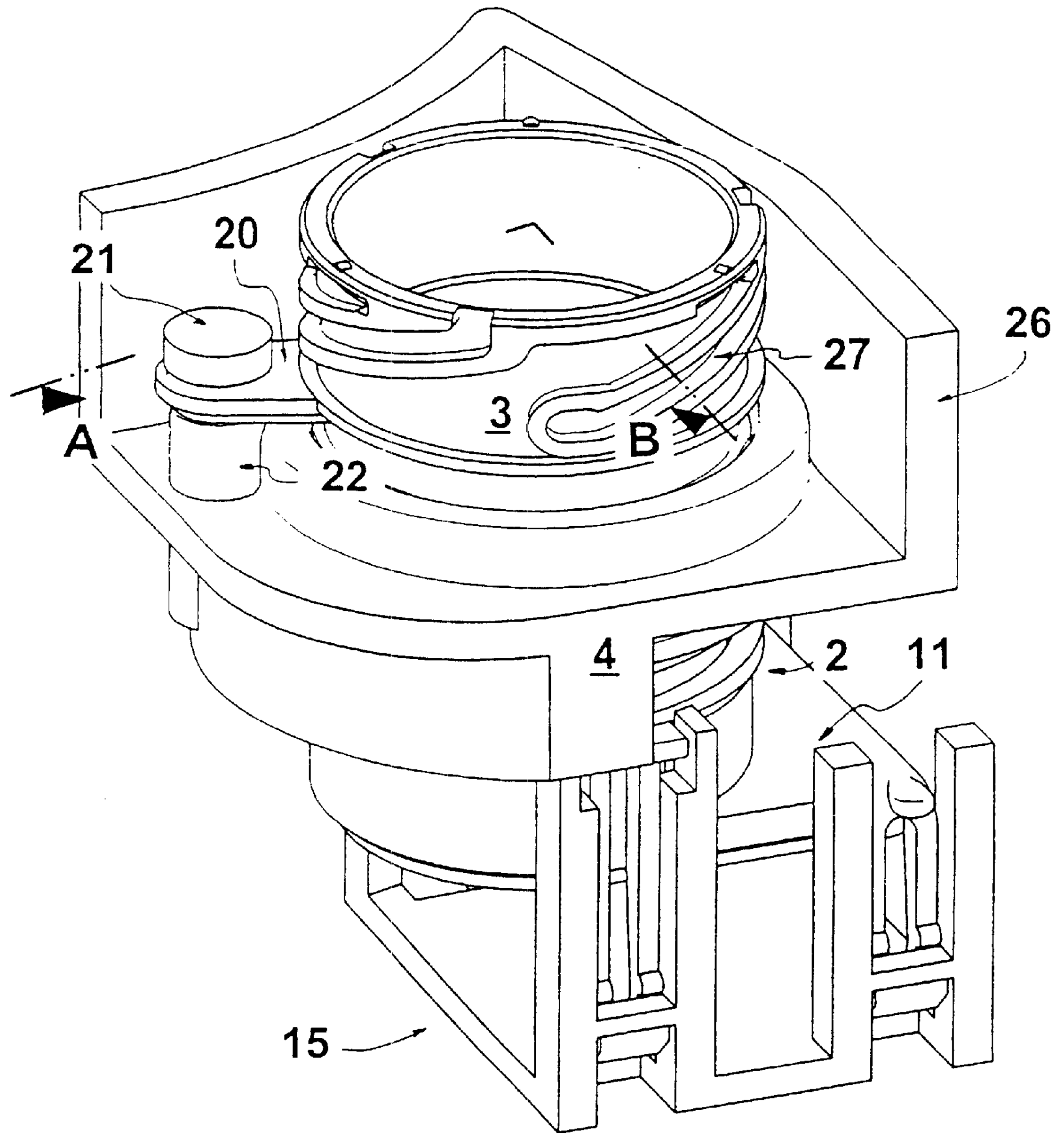
FIG. 2 shows the electrical plug connector of FIG. 1 after mounting the guide bushing.

FIG. 2 shows the arrangement from FIG. 1 mounted on the gear wall 4. The guide bushing 3 is first inserted with its lower end region into the mounting slot 6 of the plug part 2, whereby the locking pegs 10 are introduced into the locking slots 8 of the plug connector part 2 and free to move therein by clockwise rotation. The locking slots 8 have a section that slopes away from the insertion openings 9 such that during rotation of the guide bushing 3 the plug part 2 is moved away from the guide bushing 3. When the guide bushing 3 is first introduced into the mounting slot 6, the plug part 2 has been moved away in the mounting direction of the guide bushing 3, said movement having being limited by placement of the brackets 18 on the shoulders 17. This stop effect allows the guide bushing 3, along with a circumferentially placed sealing ring, to be pressed into the mounting slot 6. The guide bushing 3 is properly positioned in the mounting hole 19 of the gear wall 4 when the fastening bracket 20 lies on the hollow journal 22 shown in FIG. 2. A thread is cut into the hollow journal 22 such that the fastening screw 21 penetrating through the fastening bracket 20 attaches the guide bushing 3 and holds the entire arrangement against the gear wall 4. In this arrangement, fastened in place on gear wall 4, plug part 2, is only loosely surrounded by holder 15.

Figure 3:
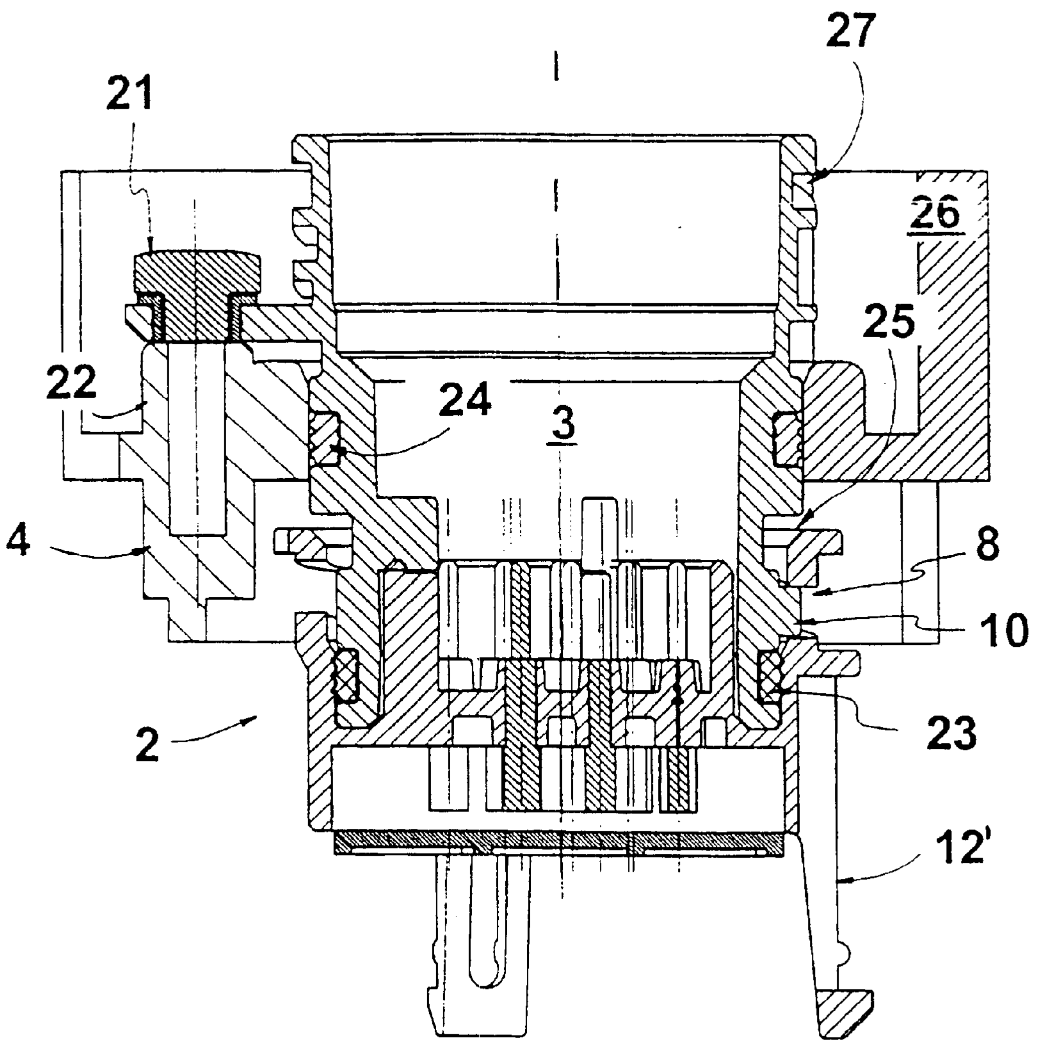
FIG. 3 shows a longitudinal section through the arrangement of FIG. 2 along the sectional plane A-B.

The engagement of the locking pegs 10 of the guide bushing 3 into the locking slots 8 of the plug part 2 is shown in the cross-sectional representation in FIG. 3. The guide bushing 3 is sealed against the annular body 7 with a sealing ring 23. The guide bushing 3 has another sealing ring 24 that seals the gap between the guide bushing 3 and the mounting hole 19.

The annular body 7 has on its upper side an inwardly directed chamfer 25 that acts in the manner of a funnel to automatically locate the mounting slot 6 during mounting of the guide bushing, by means of the forward-facing front sides of the guide bushing 3. The automatic location of the mounting slot 6 is supported by the arrangement of the plug part 2, provided with play, with its holding feet 12, 12' in the holder 15.

A locking slot 27 is externally built into the upper section of the guide bushing 3 to attach the plug jack part, not shown in the figures, in the manner of a bayonet locking.

A protective wall 26 is provided to protect the plug connector 1 mounted on the gear wall 4, and partially encloses the mounting area.

| Listing of reference terms | |
|---|---|
| 1 | Electrical plug connector |
| 2 | Plug connector part, plug part |
| 3 | Guide bushing |
| 4 | Gear wall section |
| 5 | Pin housing |
| 6 | Mounting slot |
| 7 | Annular body |
| 8 | Locking slot |
| 9 | Insertion opening |
| 10 | Locking peg |
| 11 | Base |
| 12, 12' | Holding foot |
| 13, 13' | Stops |
| 14 | Snap-on cam |
| 15 | Holder |
| 16, 16' | Guiding groove |
| 17 | Shoulder |
| 18 | Bracket |
| 19 | Mounting hole |
| 20 | Fastening bracket |
| 21 | Fastening screw |
| 22 | Hollow journal |
| 23 | Seal |
| 24 | Seal |
| 25 | Bevel, chamfer |
| 26 | Protective wall |
| 27 | Locking slot |

What is claimed is:

1. An electrical plug connector for establishing an electrical connection between two regions separated by a wall having a mounting hole, the electrical plug connector comprising:

a first plug connector part having electrical plug contacts, the first plug connector part being located on one side of the wall and being inaccessible to be fastened to the one side of the wall;

a guide sleeve having a longitudinal axis and a lower end and an upper end, wherein the lower end of the guide sleeve is passed at least partially through the mounting hole of the wall to be brought into contact with and bear the first plug connector part, and the upper end of the guide sleeve is operable to bear a second plug connector part having electrical contact jacks and being located on the other side of the wall;

means for connecting the first plug connector part and the guide sleeve together such that the first plug connector part and the guide sleeve are aligned with each other along the longitudinal axis of the guide sleeve with the first plug connector part contacting the one side of the wall after the first plug connector part and the guide sleeve have been connected together, the connecting means being configured to connect the first plug connector part and the guide sleeve together such that rotation of the guide sleeve about the longitudinal axis of the guide sleeve with respect to the first plug connector part after the guide sleeve has been brought into contact with and bears the first plug connector part causes the first plug connector part to move axially towards the guide sleeve along the longitudinal axis of the guide sleeve and be brought into contact with the one side of the wall;

means for holding the first plug connector part on the one side of the wall before the first plug connector part is connected with the guide sleeve such that the first plug connector part is aligned with the mounting hole of the wall and is movable in either direction along the longitudinal axis of the guide sleeve, the holding means including stop means for limiting the movement of the first plug connector part away from the guide sleeve to assist the means for connecting to connect the first plug connector part and the guide sleeve; and means for affixing the guide sleeve on the other side of the wall opposite the first plug connector part.

2. The electrical plug connector of claim 1 wherein:

the means for connecting include a locking slot associated with the first plug connector part and a locking peg associated with the lower end of the guide sleeve, wherein the locking peg inserts into the locking slot to connect the guide sleeve with the first plug connector part to provide a bayonet locking between the guide sleeve and the first plug connector part.

3. The electrical plug connector of claim 2 wherein:

the means for connecting further include an insertion opening associated with the first plug connector part for receiving the locking peg in order to insert the locking peg into the locking slot, wherein the locking slot has an inclined section disposed crosswise to the longitudinal axis of the guide sleeve and sloped away from the insertion opening.

4. The electrical plug connector of claim 2 wherein:

the locking slot is defined in an outer wall of an annular body having an inwardly beveled rim facing the lower end of the guide sleeve.

5. The electrical plug connector of claim 1 wherein:

the means for affixing include a fastening bracket integrally formed radially on the guide sleeve, the fastening bracket having an opening facing the wall for receiving a fastener element for affixing the guide sleeve to the other side of the wall.

6. The electrical plug connector of claim 1 wherein:

the means for holding include a plurality of holding feet that are held in respective guiding grooves of a holder that is stationarily mounted to the one side of the wall, wherein the holding feet are movable in either direction along the longitudinal axis of the guide sleeve and are biased towards the one side of the wall.

7. The electrical plug connector of claim 6 wherein:

the holding feet are integrally formed onto a base plate of the first plugged connector part and are elastic.

8. The electrical plug connector of claim 6 wherein:

the stop means includes a bracket that projects radially from the first plug connector part into a section of the guiding groove of the holder to cooperate with a shoulder placed in the guiding groove in order to limit the movement of the first plug connector part away from the guide sleeve.

* * * * *